United States Patent Office 3,222,369
Patented Dec. 7, 1965

3,222,369
PHENYLSILOXANEDIOL AMINE COMPLEXES
AND PROCESS FOR THEIR PRODUCTION
Paul I. Prescott and Terry G. Selin, Schenectady, N.Y., assignors to General Electric Company, a corporation of New York
No Drawing. Filed Nov. 1, 1962, Ser. No. 234,884
14 Claims. (Cl. 260—290)

This invention is concerned with a process for preparing high purity phenylsiloxanediols and amine complexes thereof. More particularly, the invention relates to amine complexes (hereinafter so designated) of the formula I 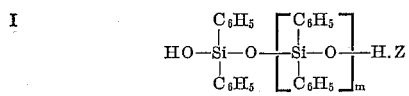

where $m$ is a whole number equal to from 1 to 2, inclusive, and Z is an organic amine moiety consisting of carbon, hydrogen, and nitrogen atoms, the said amine being selected from the class consisting of primary, secondary and tertiary amines. The invention also relates to a process for preparing high purity 1,1,3,3,-tetraphenyldisiloxanediol-1,3 or 1,1,3,3,5,5-hexaphenyltrisiloxanediol-1,5 (hereinafter referred to as the "phenylsiloxanediol") which comprises contacting an amine consisting of carbon, hydrogen and nitrogen atoms selected from the class consisting of primary, secondary and tertiary amines with a hydrolysis product of a diphenyl dihydrolyzable silane thereby to form the amine complex of the phenylsiloxanediol, and thereafter treating the formed complex to obtain the essentially pure phenylsiloxanediol, i.e., the tetraphenyldisiloxanediol or the hexaphenyltrisiloxanediol for Formula I without the amine moiety.

Hydroxylated silanes and hydroxylated polysiloxanes have been employed to improve the properties of siloxane elastomers. Thus, as shown in U.S. Patent 2,890,188, issued June 9, 1959, the presence of these hydroxylated organosilicon compositions in organopolysiloxane elastomers prevents premature hardening of these organopolysiloxane polymers containing reinforcing fillers, thus obviating the necessity of treating the filler. Additionally, the presence of these hydroxylated organosilicon compositions improves other properties of the vulcanized elastomer, particularly the thermal stability of such compositions.

Hydroxylated organosilicon compounds which have been found eminently suitable for the above purpose are 1,1,3,3-tetraphenyldisiloxanediol-1,3 and 1,1,3,3,5,5-hexaphenyltrisiloxanediol-1,5. The latter compositions are ordinarily obtained by hydrolyzing a diphenyl dihydrolyzable silane, such as diphenyldichlorosilane, with water in an excess of a suitable solvent at relatively low temperatures (e.g., −10 to 20° C.). Included in the hydrolysis reaction product are the above phenylsiloxanediols and higher polymers. However, in order to isolate the former compositions, a great deal of processing effort (including repeated recrystallizations) has been required in the past and this has involved a considerable expenditure of time and money. Even after such processing, the yields of the desired phenylsiloxanediol are relatively low since during hydrolysis and processing, the phenylsiloxanediol tends to condense to form higher molecular weight products, thus contributing to the reduced yield of the above desired phenylsiloxanediols.

Unexpectedly, we have discovered that certain amines have an unpredicted affinity for these phenylsiloxanediols and by taking advantage of this affinity, we are able to isolate the desired phenylsiloxanediol in the form of an amine complex of the phenylsiloxanediol from mixtures containing the latter in a relatively short period of time with a minimum of processing steps. These amine complexes can be readily decomposed to give essentially pure 1,1,3,3-tetraphenyldisiloxanediol-1,3 or 1,1,3,3,5,5-hexaphenyltrisiloxanediol-1,5. This rapid and relatively inexpensive method for isolating the phenylsiloxanediol is accomplished by contacting the hydrolysis product of the diphenyldihydrolyzable silane (either the bulk hydrolysis product or crudely isolated phenylsiloxanediols) with the amine, isolating the amine complex which, most usually being crystalline, is readily removed by filtration, and, thereafter decomposing the amine complex by suitable means whereby essentially pure phenylsiloxanediol is obtained.

One of the unexpected discoveries was that, of the cyclic tertiary amines containing nitrogen in the ring, pyridine had a unique characteristic of having a special affinity for the phenylsiloxanediol so that when the pyridine complex of the phenylsiloxanediol was made, it was found that this pyridine complex was insoluble in diethyl ether making it quite easy to separate the pyridine complex from the remainder of the reaction mixture. This diethyl ether insolubility of the pyridine complex was not a characteristic of complexes of the phenylsiloxanediol made with other amines, such as pyrrole, triethylamine, quinoline, isoquinoline, picoline, lutidine, collidine, aniline, or cyclohexylamine.

The diphenyl dihydrolyzable silanes employed to make the phenylsiloxanediol are those having the formula II 

where X is a hydrolyzable group selected from the class consisting of halogen (e.g., chlorine, bromine, fluorine, etc.), acyloxy (e.g., acetoxy, propionoxy, etc.), organoxy (e.g., methoxy, ethoxy, propoxy, phenoxy, etc.) radicals.

Hydrolysis of the diphenyl dihydrolyzable silane with water is advantageously carried out under such conditions and in the presence of a suitable inert solvent which tend to give the low molecular weight products and specifically the aforesaid phenylsiloxanediols. This is usually accomplished by employing temperatures of from about −10° C. to 20° C., employing for the purpose, solvents such as acetone, diethyl ether, benzene, toluene, xylene, cyclohexane, etc. Generally, it is only necessary to add the diphenyl dihydrolyzable silane to an amount of water at least sufficient to hydrolyze essentially all the silicon-bonded hydrolyzable groups employing the solvent, on a weight basis, in an amount ranging advantageously from about 0.1 to about 10 parts or more per part of the diphenyl dihydrolyzable silane.

The amines which may be employed in the practice of the present invention may be either primary, secondary or tertiary amines and may be aliphatic or aromatic amines. Included in these amines are cyclic aliphatic amines in which nitrogen is part of the ring. Among the primary, secondary and tertiary amines which may be employed are those having the general formula III 

where $p$ is a whole number equal to from 1 to 3 and R is a monovalent hydrocarbon selected from the class consisting of alkyl radicals (e.g., methyl, ethyl, propyl, isobutyl, butyl, dodecyl, etc.); aryl radicals (e.g., phenyl, biphenyl, naphthyl, etc.); aralkyl radicals (e.g., benzyl, phenylethyl, etc.); alkaryl radicals (e.g., tolyl, xylyl, ethylphenyl, etc.); alkenyl radicals (e.g., vinyl, allyl, methallyl, etc.).

Among the primary, secondary and tertiary amines which can be employed corresponding to the above formula III are, for instance, trimethyl amine, triethyl amine, tripropyl amine, dimethyl amine, diethyl amine, diphenyl amine, tribenzyl amine, cyclohexyl amine, etc.

Another class of organic amines which may be employed are those having the formula IV 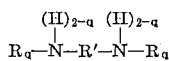

where $q$ is a whole number equal to from 0 to 2, inclusive, R has the meaning given above and R' is a divalent hydrocarbon radical of either the aliphatic or aromatic series. Among such divalent radicals may be mentioned the methylene radical, ethylene radical, propylidine [—CH(CH$_3$)CH—$_2$] radical, phenylene radical

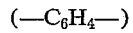

etc. Among such compounds may be mentioned methylene diamine, N,N'-dimethyl ethylene diamine, ethylene diamine, phenylene diamine (where the amino groups may be ortho, meta or para), N,N'-dimethyl ethylene diamine, N,N,N',N'-tetramethyl ethylene diamine, etc.

Among the cyclic amines in which nitrogen is part of the ring structure may be mentioned, for example, pyridine, pyrrole, quinoline, isoquinoline, picoline, lutidine, collidine, piperazine, etc.

The amine is added in any desired amount, but advantageously in an amount equal to from about 0.25 to about 10 or more moles, and preferably from 0.75 to 2 moles of the amine per mole of the diphenyl dihydrolyzable silane used. For optimum results it is only necessary to add a sufficient amount of the amine so that there would be present in the hydrolysis mixture about one mole of amine per mole of the formed phenylsiloxanediol or mixture of phenylsiloxanediols. However, the use of smaller or larger molar concentrations of the amine is not precluded. Heating at this point of the reaction mixture up to temperatures of from 40° to 80° C. is not precluded. It is often desirable to remove from the amine complex, the diphenylsilanediol which often separates out in the presence of certain of the solvents used in making these complexes. There is thus obtained in the reaction mixture a crystalline complex which has the Formula I where $m$ and Z have the representations given above. The addition of the amine can be made to the hydrolysis product directly, using the same solvents employed for hydrolysis purposes. Alternatively, the crude phenylsiloxanediol can be separated and dissolved in the same class of inert solvents (i.e., inert to the reactants or reaction products) used in the above hydrolysis of the diphenyl dihydrolyzable silane and the amine can then be added to this solution. When the crude phenylsiloxanediol is isolated and dissolved in a solvent prior to addition of the amine, the phenylsiloxanediol is used on a weight basis, of from 0.2 to 10 or more parts of the solvent per part of phenylsiloxanediol.

The above amine complex can be readily treated to obtain the essentially pure phenylsiloxanediol. Thus, the isolated amine complex can be heated at a temperature of about 75–100° C. at a reduced pressure of about 1–50 mm. whereby the amine is removed to leave behind essentially pure phenylsiloxanediol. Alternatively, the complex can be mixed with weak acids such as formic acid, acetic acid, etc., or with dilute strong acids, e.g., dilute aqueous solutions of hydrochloric, sulfuric, phosphoric, etc., acids, to sever the bond between the amine and the phenylsiloxanediol, again to yield essentially pure phenylsiloxanediol.

As pointed out above, the phenylsiloxanediol itself can be used for reducing the structure of organopolysiloxane elastomers containing reinforcing fillers. Thus, it is apparent that the amine complex constitutes an important intermediate for obtaining pure phenylsiloxanediol. The above-mentioned complex can also be employed as a reactant for making cyclic organopolysiloxanes as is more particularly disclosed in our copending application Serial No. 234,883, filed concurrently herewith and assigned to the same assignee as the present invention. Thus, the amine complex of 1,1,3,3,-tetraphenyldisiloxanediol-1,3 can be reacted with a diorganodihydrolyzable silane, such as, for instance, dimethyldichlorosilane or diphenyldichlorosilane, to give cyclic polymers having, respectively, the formulas

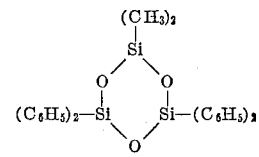

and

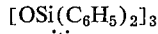

The above cyclic compositions are more specifically disclosed and claimed in U.S. patent applications Serial No. 160,264, in the name of Christian R. Sporck, and Serial No. 160,267, now abandoned, in the name of Howard A. Vaughn, both filed December 18, 1961, and assigned to the same assignee as the present invention.

These cyclic polymers can be heated in the presence of organopolysiloxane rearrangement and condensation catalysts to make silicone elastomers useful in electrical insulation and heat-protective applications, as is more particularly disclosed and claimed in Brown et al. application Serial No. 160,266, filed December 18, 1961, now abandoned, and assigned to the same assignee as the present invention.

In order that those skilled in the art may better understand how the present invention may be practiced, the following examples are given by way of illustration and not by way of limitation. All parts are by weight unless otherwise indicated.

EXAMPLE 1

This example illustrates the extended processing usually required to prepare the pure phenylsiloxanediols of the formula V 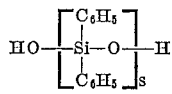

where $s$ is either two or three. A solution of about 50 grams diphenyldichlorosilane in 40 ml. acetone was poured into a mixture of 80 ml. acetone and 80 ml. water. The temperature of the solution rose immediately to the boiling point of the mixture and after a few seconds a phase separation occurred. After about 15 minutes of stirring, 100 ml. water was added and the two layers which formed after standing for 18 hours were separated. The lower layer was diluted with an equal volume of benzene, washed with water, evaporated to remove any acetone, the residue dissolved in 100 ml. benzene and then left standing for 18 hours to allow about 0.7 gram diphenylsilanediol to crystallize out. The remaining liquid filtrate was then heated to remove the excess benzene. The residue was then added to about 60 ml. benzene and 250 ml. petroleum ether and allowed to stand for three days to give a crude crystalline deposit of the phenylsiloxanediol. Recrystallization from the same mixture of benzene and petroleum ether gave a product melting between 113–114.5° C., which was identified as pure 1,1,3,3-tetraphenyldisiloxanediol-1,3.

EXAMPLE 2

23 grams of the 1,1,3,3-tetraphenyldisiloxanediol-1,3 prepared in Example 1, 250 ml. of purified n-hexane, and 40 grams of dry pyridine were mixed together and stirred for several hours. There was thus obtained a large amount of crystalline material which was filtered, washed with n-hexane again and air-dried to yield 27.1 grams of the desired pyridine complex of the tetraphenyldisiloxanediol. This composition which was obtained in a 99% yield was identified as the pyridine complex of the aforesaid tetraphenyldisiloxanediol having the formula VI
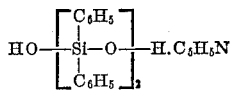

as evidenced by the following analyses:

| Element | Found | Theoretical |
| --- | --- | --- |
| Percent H | 5.29 | 5.45 |
| Percent C | 70.48 | 70.51 |
| Percent N | 2.79 | 2.84 |
| Percent Si | 11.57 | 11.36 |
| Percent Hydroxyl (—OH) | 6.79 | 6.89 |

EXAMPLE 3

In this example, 20.7 grams 1,1,3,3-tetraphenyldisiloxanediol-1,3 prepared in Example 1 was mixed with 7.9 grams pyridine in equimolar concentrations, employing a solution of the phenylsiloxanediol in 100 ml. diethyl ether. Immediately after addition of the pyridine, a crystalline composition deposited and this was filtered and identified as the pyridine complex of the phenylsiloxanediol having Formula VI. This composition had a melting point of 123–124.5° C. and was stable in a vacuum of 2 mm. Hg when measured at 65° C.

EXAMPLE 4

This example illustrates the isolation of pure tetraphenyldisiloxanediol-1,3 from the complex thereof. More particularly, about 5 parts of the phenylsiloxanediol pyridine complex prepared in Example 3 was mixed with about 10 parts diethyl ether and 10 parts water. Thereafter, about 0.01 part concentrated HCl (about 37% HCl) was added. Whereas initially the complex was insoluble in the diethyl ether and water mixture, after the HCl was added the solid quickly went into solution. The ether layer was separated and the ether was evaporated on a steam bath to yield a solid composition. Upon recrystallization of this solid from hot benzene and hexane, pure tetraphenyldisiloxanediol-1,3 was obtained having a melting point of 112–114° C. A mixed melting point with a pure sample of tetraphenyldisiloxanediol-1,3 (which is described in Journal of the American Chemical Society, 67, 2173–2174 (1945), gave no depression in the melting point.

EXAMPLE 5

This example illustrates the preparation of the pyridine complex of 1,1,3,3,5,5-hexaphenyltrisiloxanediol-1,3 having the formula VII
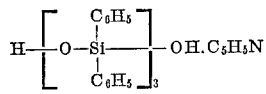

More particularly, 10 parts 1,1,3,3,5,5-hexaphenyltrisiloxanediol-1,5 (melting point 112–113° C., the preparation of which is described in Journal of the American Chemical Society, 67, 2173–4 [1945]) was dissolved in about 39 parts pyridine. Thereafter, 43 parts toluene were added to the solution and the resulting solution was slowly poured into about 165 parts n-hexane. Well defined crystals formed over a period of two to three minutes after addition of the hexane. These crystals were removed and recrystallized from a small amount of a hexane-toluene solution containing the solvents in equal parts by volume. The dry crystalline product was identified as the pyridine complex having the Formula VII above, as evidenced by the following analyses:

| Element | Found | Theoretical |
| --- | --- | --- |
| Percent H | 5.16 | 5.30 |
| Percent C | 71.12 | 71.15 |
| Percent N | 2.21 | 2.03 |
| Percent Si | 11.93 | 12.39 |
| Percent Hydroxyl (—OH) | 5.00 | 4.92 |

When this material was heated between 80°–95° C., the product melted then crystallized, and the resulting amine-free phenylsiloxanediol melted at the melting point of the pure hexaphenyltrisiloxanediol.

EXAMPLE 6

This example illustrates the preparation of the pyridine complex of 1,1,3,3-tetraphenyldisiloxanediol-1,3 using a different solvent system for making the complex. More particularly, 268 grams of the tetraphenyldisiloxanediol was dissolved in 500 ml. toluene at 60–70° C. To this warm solution was added 79 grams of dry pyridine and after one minute a large mass of crystals formed. The mixture was cooled and the product collected by filtration. After washing the product with fresh toluene and drying, there was obtained 306 grams of the pyridine complex of the tetraphenyldisiloxanediol (96% yield). This composition had a melting point of 124–125° C. and was established by infrared analysis to be the desired pyridine complex of Formula VI.

The following example shows means by which the crude hydrolyzate of a diphenyldihydrolyzable silane, e.g., diphenyldichlorosilane, can be treated in accordance with our process to obtain good yields of the aforesaid phenylsiloxanediol complex. It is believed that this complex is derived not only from the presence of the 1,1,3,3-tetraphenyldisiloxanediol-1,3 but also is derived as a result of condensing the diphenylsilanediol present in the hydrolysis product to the phenylsiloxanediol state and making the pyridine complex therefrom.

EXAMPLE 7

About 253 grams diphenyldichlorosilane in 200 ml. acetone was added to 400 ml. water mixed with 400 ml. acetone. The mixture was stirred for about 5 minutes and thereafter 750 ml. additional water was added to insure complete hydrolysis of the silicon-bonded chlorines and to facilitate the formation of a two-phase system. After allowing the hydrolysis mixture to stand for about 18 hours, the acetone layer was removed, washed with an additional amount of 500 ml. water and the acetone was evaporated to dryness to give a slightly oily solid which was composed mainly of diphenylsilanediol, 1,1,3,3-tetraphenyldisiloxanediol-1,3 and higher polysiloxanediols predominantly 1,1,3,3,5,5-hexaphenyltrisiloxanediol-1,5. The oily solid mass was dissolved in 150 ml. diethyl ether and 150 ml. pyridine was added. A precipitate of the phenylsiloxanediol pyridine complex was obtained immediately. This precipitate was removed by filtration, washed with about 100 ml. diethyl ether to yield about 140 grams essentially pure pyridine complex of 1,1,3,3-tetraphenyldisiloxanediol-1,3. The remaining ether solution was evaporated to dryness over a steam bath under vacuum at a temperature somewhat below 75° C. to remove essentially all the diethyl ether. The remaining liquid containing pyridine was further evaporated on a steam bath to yield a solid-oil mixture. To this mixture was added 75 ml. diethyl ether to render insoluble a further amount of the above phenylsiloxanediol complex which was removed by filtration, washed with diethyl ether, the diethyl ether removed to yield an additional 45 grams of the phenylsiloxanediol complex.

EXAMPLE 8

About 10 parts diphenylsilanediol (which is a first order hydrolysis product of diphenyldichlorosilane) in 10 parts benzene was mixed with an amount of pyridine in molar excess of the diphenylsilanediol and the mixture was heated at a temperature of about 80° C. for about 5 minutes, to yield the above-described phenylsiloxanediol-pyridine complex as a precepitate when the reaction mass was cooled to room temperature (about 23° C.).

EXAMPLE 9

A number of amines were reacted with the hexaphenyltrisiloxanediol-1,3 similary as was done in the preceding example employing for the purpose about 1 part of the phenylsiloxanediol dissolved in about 3.5 parts toluene to which was added about 1 to 2 parts of the amine and then diluting the entire mixture with 17 parts n-hexane. The solid complexes which formed were recrystallized from 1:1 weight hexane-toluene solution and thereafter identified as the desired amines of Formula I where Z represented the particular amine used. Further evidence of the amine complex was determined at the time the melting point was determined for each of the complexes since decomposition accompanying the melting point determination resulted in an odor of an amine which was the same one as used to make the complex. The following Table I shows the various amines used to make the complex together with the determined melting point (the spread being often due to liberation of the amine) together with the amine identified by odor during the melting point determination. Table II shows elemental analysis on some of the amine complexes further identifying the complexes, together with the amine content.

amine complex of the phenylsiloxanediol, can also be varied within wide limits as mentioned above without departing from the scope of the claimed invention.

What we claim as new and desire to secure by Letters Patent of the United States is:

1. A composition of matter having the formula

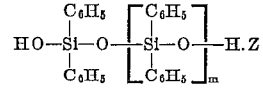

where Z is an organic amine selected from the class consisting of amines having the formulas

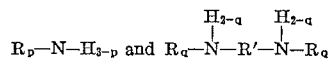

and pyridine, pyrrole, quinoline, isoquinoline, picoline, lutidine, collidine, and piperazine, where R is a monovalent hydrocarbon radical selected from the class of aliphatic and aromatic hydrocarbon radicals, $p$ is a whole number from 1 to 3, and $q$ is a whole number from 0 to 2, and $m$ is a whole number equal to from 1 to 2, inclusive.

2. A composition of matter having the formula

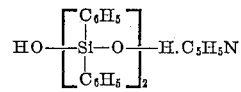

3. A composition of matter having the formula

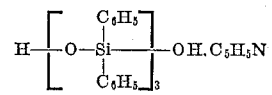

Table I

| Amine * | Melting Point of Complex, ° C. | Amine Odor Observed During Melting |
|---|---|---|
| $(C_2H_5)_3N$ | 90–95 | $(C_2H_5)_3N$ |
| $(C_2H_5)_2NH$ | 104–109 | $(C_2H_5)_2NH$ |
| $(CH_3)_2NCH_2CH_2N(CH_3)_2$ | 98–112 | $(CH_3)_2NCH_2CH_2N(CH_3)_2$ |
| $C_6H_5NH_2$ | 86–88 | $C_6H_5NH_2$ |

* Amine used to make the amine complex of tetraphenyldisiloxanediol-1,3 of Formula I.

Table II

| Amine Complex | Found Percents | | | | Theoretical Percents | | | |
|---|---|---|---|---|---|---|---|---|
| | C | H | Si | OH | C | H | Si | OH |
| $HO-[-Si(C_6H_5)_2-O-]_2-H \cdot C_6H_5NH_2$ | 70.1 | 5.7 | 11.2 | 6.9 | 71.0 | 5.7 | 11.1 | 6.7 |
| Amine Content: | Found 18.0% | | | | Theoretical 18.3% | | | |
| $HO-[-Si(C_6H_5)_2-O-]_2-H \cdot (C_2H_5)_2NH$ | 67.3 | 6.8 | 12.55 | 7.1 | 69.0 | 6.8 | 11.5 | 7.0 |
| Amine Content: | Found 14.8% | | | | Theoretical 15.0% | | | |

It will, of course, be apparent to those skilled in the art that in addition to using the hydrolysis product of diphenyldichlorosilane, hydrolysis products of other diphenyldihydrolyzable silanes, many examples of which are given above, may be employed without departing from the scope of the invention. The solvents in which the hydrolysis of the diphenyl dihydrolyzable silane is carried out or in which the phenylsiloxanediol is dissolved prior to the addition of the amine, the conditions under which the reaction with the amine to form the complex is undertaken, and the separation and isolation of the 4. A composition of matter having the formula

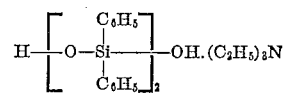

5. A composition of matter having the formula

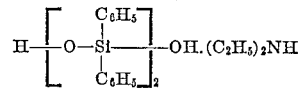

6. A composition of matter having the formula

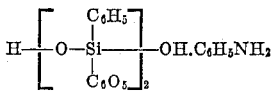

7. A composition of matter having the formula

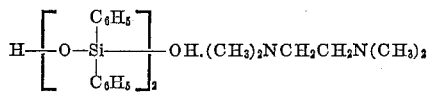

8. The process for making a pyridine complex of the formula

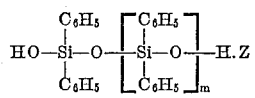

where Z is an organic amine selected from the class consisting of amines having the formulas

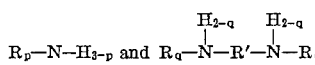

and pyridine, pyrrole, quinoline, isoquinoline, picoline, lutidine, collidine, and piperazine, where R is a monovalent hydrocarbon radical selected from the class of aliphatic and aromatic hydrocarbon radicals, $p$ is a whole number from 1 to 3, and $q$ is a whole number from 0 to 2, and $m$ is whole number equal to from 1 to 2, inclusive, which comprises forming an intimate mixture of an organic amine and a hydrolysis product of a dihydrolyzable silane having the formula

where X is a hydrolyzable group selected from the class consisting of halogen, acetoxy, propionoxy, methoxy, ethoxy, propoxy, and phenoxy radicals, and thereafter islating the amine complex of the above formula, the aforesaid hydrolysis product containing as essential ingredients therein a siloxanediol selected from the class consisting of 1,1,3,3-tetraphenyldisiloxanediol-1,3 and 1,1,3,3,5,5-hexaphenyltrisiloxanediol-1,5.

9. The process for obtaining a pyridine complex of 1,1,3,3-tetraphenyldisiloxanediol-1,3 which comprises forming an intimate mixture of 1,1,3,3-tetraphenyldisiloxanediol-1,3 with pyridine in a suitable inert solvent and thereafter isolating the pyridine complex.

10. The process for obtaining a pyridine complex of 1,1,3,3,5,5-hexaphenyltrisiloxanediol-1,3 which comprises forming an intimate mixture of 1,1,3,3,5,5-hexaphenyltrisiloxanediol-1,3 with pyridine in a suitable inert solvent and thereafter isolating the pyridine complex.

11. The process for obtaining a triethylamine complex of 1,1,3,3-tetraphenyldisiloxanediol-1,3 which comprises forming an intimate mixture of 1,1,3,3-tetraphenyldisiloxanediol-1,3 with triethylamine in a suitable inert solvent and thereafter isolating the triethylamine complex.

12. The process for obtaining a diethylamine complex of 1,1,3,3-tetraphenyldisiloxanediol-1,3 which comprises forming an intimate mixture of 1,1,3,3-tetraphenyldisiloxanediol-1,3 with diethylamine in a suitable inert solvent and thereafter isolating the diethylamine complex.

13. The process for obtaining an aniline complex of 1,1,3,3-tetraphenyldisiloxanediol-1,3 which comprises forming an intimate mixture of 1,1,3,3-tetraphenyldisiloxanediol-1,3 with aniline in a suitable inert solvent and thereafter isolating the aniline complex.

14. The process for obtaining a N,N,N',N'-tetramethylethylenediamine complex of 1,1,3,3-tetraphenyldisiloxanediol-1,3 which comprises forming an intimate mixture of 1,1,3,3-tetraphenyldisiloxanediol-1,3 with N,N,N',N'-tetramethylethylenediamine in a suitable inert solvent and thereafter isolating the N,N,N',N'-tetramethylethylenediamine complex.

References Cited by the Examiner
UNITED STATES PATENTS

| | | | |
|---|---|---|---|
| 2,838,515 | 6/1958 | Sommer | 260—290 |
| 2,899,453 | 8/1959 | Spector et al. | 260—443.2 |
| 2,924,601 | 2/1960 | Brown | 260—290 |
| 3,046,294 | 7/1962 | Pike | 260—448.2 |

OTHER REFERENCES

Chemical Abstracts, vol. 51 (1957), column 6271ef.

WALTER A. MODANCE, *Primary Examiner.*
NICHOLAS S. RIZZO, JOHN D. RANDOLH,
*Examiners.*